United States Patent
Nixon et al.

(10) Patent No.: US 6,940,994 B2
(45) Date of Patent: Sep. 6, 2005

(54) PASSIVE POWER LINE DETECTION SYSTEM FOR AIRCRAFT

(75) Inventors: Matthew D. Nixon, Albuquerque, NM (US); Rohan Loveland, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 662 days.

(21) Appl. No.: 10/040,594

(22) Filed: Jan. 7, 2002

(65) Prior Publication Data

US 2002/0153485 A1 Oct. 24, 2002

Related U.S. Application Data

(60) Provisional application No. 60/274,514, filed on Mar. 9, 2001.

(51) Int. Cl.$^7$ .................................................. G06K 9/00
(52) U.S. Cl. ........................ 382/100; 340/946; 250/330
(58) Field of Search .......................... 382/100; 250/287, 250/390, 316.1, 330, 338.1, 339.8, 339.11, 341.8; 244/3.16, 50, 51, 62, 139, 144, 183, 190, 2; 340/946, 971, 945, 948, 961; 701/31, 35, 120; 356/5.01; 342/29, 33, 63, 2; 343/705, 708

(56) References Cited

U.S. PATENT DOCUMENTS

| | | | | |
|---|---|---|---|---|
| 4,015,235 A | * | 3/1977 | Demaine et al. ............ 340/958 |
| 4,267,562 A | * | 5/1981 | Raimondi .................... 348/144 |
| 5,128,874 A | * | 7/1992 | Bhanu et al. ................ 701/301 |
| 5,422,828 A | * | 6/1995 | Choate et al. .............. 342/458 |
| 5,465,142 A | * | 11/1995 | Krumes et al. ............ 356/5.01 |
| 5,714,948 A | * | 2/1998 | Farmakis et al. ........... 340/961 |
| 5,931,874 A | * | 8/1999 | Ebert et al. .................... 701/1 |
| 6,215,327 B1 | * | 4/2001 | Lyke ............................ 326/41 |
| 6,456,226 B1 | * | 9/2002 | Zheng et al. ............. 342/26 R |
| 6,487,519 B1 | * | 11/2002 | O'Neill et al. .............. 702/176 |
| 6,549,828 B1 | * | 4/2003 | Garrot et al. .................. 701/1 |

* cited by examiner

Primary Examiner—Kanjibhai Patel
Assistant Examiner—Abolfazl Tabatabai
(74) Attorney, Agent, or Firm—Harness Dickey & Pierce P.L.C.

(57) ABSTRACT

A passive, real-time obstacle detection system is provided that determines the presence of small, curvilinear objects such as power lines. The system generally comprises a payload system having an infrared image detection system, a crew interface having a display for the images, and software algorithms that perform image processing on the pixel images. The software algorithms employ Cellular Automata (CA) techniques to resolve the direction vectors of sub-pixels, and as such, line segments are produced that are subsequently linked for display to the flight crew. The CA techniques are further based on the "Game of Life" model, wherein local rules are used to determine how pixels evolve, or propagate along a line. The linked lines are then displayed for the flight crew so that evasive maneuvers can be performed as necessary.

20 Claims, 9 Drawing Sheets

PASSIVE POWER LINE DETECTION SYSTEM FOR AIRCRAFT

CROSS-REFERENCE TO RELATED APPLICATIONS

This application is based upon Provisional Patent Application, Ser. No. 60/274,514, entitled "Passive Power Line Detection System for Aircraft," filed Mar. 9, 2001, the contents of which are incorporated herein by reference in their entirety and continued preservation of which is requested.

STATEMENT REGARDING FEDERALLY SPONSORED RESEARCH

The present invention was made with Government support under Contract Number N68936-00-C-0060 awarded by the United States Navy. Accordingly, the United States Government has certain rights in the present invention.

FIELD OF THE INVENTION

The present invention relates generally to imaging systems and more particularly to imaging systems for the detection and avoidance of small curvilinear obstacles, e.g. power lines, by mobile aircraft.

BACKGROUND OF THE INVENTION

The detection and avoidance of power lines, guy wires, and other small curvilinear obstacles while flying an aircraft is of critical importance in ensuring flight crew safety and continued flight operations. With military aircraft especially, low altitude flights (e.g., below 1,000 ft.) are common in support of a variety of missions. Generally, military aircraft comprise fixed wing and rotary wing, in addition to manned and unmanned configurations. Similarly, commercial aircraft such as news helicopters and small private aircraft also fly at low altitudes and must also have an awareness of small obstacles such as power lines. The power lines, however, are difficult to identify due to their small size and aspect. With increasing pilot workload in the cockpit relative to other flight systems, detection of power lines becomes an even more difficult task.

Obstacle detection can further be categorized into active and passive detection. Active detection involves transmission of a signal from the aircraft to the obstacle and subsequent reception of a signal by the aircraft back from the obstacle, e.g. radar. Passive detection involves only reception of a signal from the obstacle by the aircraft such that the aircraft is not transmitting any signals, e.g. infrared imaging. Active detection becomes undesirable in instances where the aircraft must remain covert and undetectable, as required in many military missions. Further, the transmissions from active detection systems may interfere with other flight instruments and cause problems with flight operations. Passive detection of obstacles, therefore, is highly desirable in many applications.

Due to stringent performance requirements of many aircraft, related hardware for obstacle detection systems must be as compact and lightweight as possible. However, because power lines are inherently small, high resolution equipment is required to detect an obstacle of such small size. Unfortunately, higher resolution equipment is larger and heavier, and further more costly. As a result, high resolution systems for power line detection can be performance and cost inhibiting on certain aircraft platforms.

Typically, small obstacles such as power lines are identified simply with the eyesight of the pilot, and in some instances, image software and hardware on-board the aircraft. One obstacle detection system of the known art is the Digital Terrain Elevation Database (DTED), which is a system having a database of obstacles with their respective spatial coordinates. Accordingly, the DTED system alerts the pilot to known obstacles in the database during flight operations. Unfortunately, only a limited number of obstacles are loaded in the database, and therefore, the pilot must remain alert to obstacles not previously loaded therein. In addition to an incomplete database, such a system can further provide a false sense of security to the flight crew, resulting in increased safety risks.

Additional known art obstacle detection systems include Millimeter Wave Radar (MMW Radar) and Laser Radar (LADAR). However, the radar systems are active and thus are undesirable during covert flight operations since the radar transmissions can be detected, and further due to potential interference between the radar transmissions and other flight instruments. Additionally, some radar systems are incapable of real-time processing, such that a longer period of time is required between obstacle detection and initiating an evasive maneuver to avoid the obstacle. Moreover, the radar systems are generally expensive, large, and heavy, and as a result may be prohibitive on certain aircraft platforms.

Yet a further detection system of the known art measures the electromagnetic radiation emanating from power lines to detect the presence of the lines during flight operations. Electromagnetic radiation detection, however, is subject to the variations in electricity demands in areas of modest population density. As a result, the ranges of electromagnetic radiation that trigger an alarm vary greatly, and thus, the detection systems are unpredictable in areas of high electromagnetic variations. Moreover, many electromagnetic radiation systems are incapable of real-time processing, which increases the minimum distance between the aircraft and the obstacle for reliable warnings.

Accordingly, there remains a need in the art for a real-time, passive obstacle detection system that is lightweight, compact, and affordable. The detection system must further be applicable to a variety of aircraft platforms and easily retrofittable with existing aircraft systems.

SUMMARY OF THE INVENTION

In one preferred form, the present invention provides a passive obstacle detection system that comprises a payload system having infrared (IR) detection hardware, software algorithms for control of the IR hardware and for image processing, and a crew interface for display of the obstacles. As the aircraft is traversing along a flight path, the obstacle detection system detects curvilinear obstacles using the software algorithms, and the flight crew is alerted to the obstacle with on-board equipment including a video display of the obstacle. Accordingly, the pilot is able to perform flight maneuvers to avoid the obstacle in sufficient time.

Generally, the payload system is a low cost gimbaled infrared (IR) imaging system that includes a gimbal, processors, stabilization and controls, and IR sensors. The software algorithms are based upon Cellular Automata (CA) techniques, which are simplified mathematical systems made of cells, or pixels as applied herein, arranged on a grid. Generally, each cell has a state, and all states evolve simultaneously according to a set of rules that define how a state is to change in response to its current state and the state of surrounding cells, or neighbors.

Accordingly, the software algorithms of the present invention comprise three primary functions. The first function generates a field of direction vectors for image pixels, the second propagates pixels along line segments based on the direction vectors, and the third links line segments for subsequent display to the flight crew.

More specifically, the first function generates a field of direction vectors for the current image, which are partial directional derivatives of objects, or pixels, in the image field or frame of video. Differentiation results in an emphasis of the high frequency components, or the pixels with high spatial frequency. The field of direction vectors, therefore, is a two-dimensional map of the x and y direction components which comprise the angle of pixels within the image field. From an original image as provided by the IR sensors, a vertical mask is incorporated to emphasize horizontal features, while a horizontal mask is similarly incorporated to emphasize the vertical features of the image. From these gradient component images, a magnitude image is generated for the objects within the image. Additionally, the gradient component images are recombined to generate the field of direction vectors. As a result of the field of direction vectors, each pixel has a magnitude and a vector direction. Further, the resulting field of direction vectors is displayed in an image where pseudo colors are indicative of direction. The pseudo colors are for display purposes and are not used as a part of the image analysis routines.

After a field of direction vectors is generated, the second primary software function employs CA techniques to propagate the direction of the pixels along line segments. Accordingly, the principles of Conway and Gardiner's "Game of Life" are applied to determine pixel propagation. With the Game of Life model as applied to the present invention, if a pixel of a given vector direction has a neighbor pixel with approximately the same vector direction, the pixel is propagated along a line. Accordingly, the pixel becomes "live." If a pixel does not have a neighbor pixel with approximately the same vector direction, the pixel is not propagated and thus becomes "dead." Additionally, during propagation, the "momentum" of a line segment is given high weight, such that if a disruption in a continuous line becomes present, e.g. a bird sitting on a power line, the algorithm will continue along the line segment for a distance to determine if the discontinuity is to be filtered out. As a result of the CA computations, the pixel is propagated along a line to generate line segments for the third primary function of the software algorithms.

The third primary function of the software algorithms links the line segments generated by the CA routine using a conventional third order curve fitting routine. If the line segments fit to other segments using the curve fitting routine, then the segments are joined. The joined segments are then presented on the display to the flight crew such that evasive maneuvers can be performed as necessary. The joining of line segments is not critical to line detection; rather, the joining is for display purposes for the flight crew. Accordingly, the present invention contemplates that displaying one long segment rather than several short segments is beneficial to the pilot in making avoidance maneuver decisions.

Because the obstacle is modeled and analyzed using a simple set of rules with CA, obstacle detection occurs in real-time (approximately 30 frames per second) such that the pilot has sufficient warning to maneuver away from the obstacle. Furthermore, the related hardware is small, lightweight, and low cost relative to other imaging systems and is therefore highly desirable for a variety of aircraft platforms.

In another preferred form, the obstacle detection system of the present invention may be deployed autonomously, such that the aircraft flight controls are automatically adjusted according to the impending obstacle without the intervention of a human pilot or flight controller. Accordingly, the system of the present invention has application to both manned and unmanned vehicles. Due to the high false alarm rates, however, the inclusion of a human in the loop is desirable for most applications.

In yet another preferred form, the present invention provides a passive ranging system to reduce the probability of false alarms by assigning a range to each of the detected obstacles, allowing those that are sufficiently far away to be filtered out. For example, a road on the side of a mountain in the distance may have the exact same appearance geometrically as a power line much closer to the aircraft. Passive ranging assists in distinguishing between objects that have similar geometries, but dissimilar ranges, thereby reducing the number of false alarms. The passive ranging system also provides information regarding the range to other types of obstacles, for example terrain. Therefore, the passive ranging system has applicability for the prevention of controlled flight into terrain (CFIT) incidents.

With the passive ranging system, an optical flow technique is employed that represents the motion of the object space as a projection onto the image plane of a video camera. With the projection, depth mapping is performed such that the range from the aircraft to the objects in the plane can be determined. Further, an optical flow field is produced, which is a two-dimensional mapping of direction vectors indicating whether the aircraft is approaching or moving away from the object in the plane.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiments is merely exemplary in nature and is in no way intended to limit the invention, its application, or uses.

Figure 1:
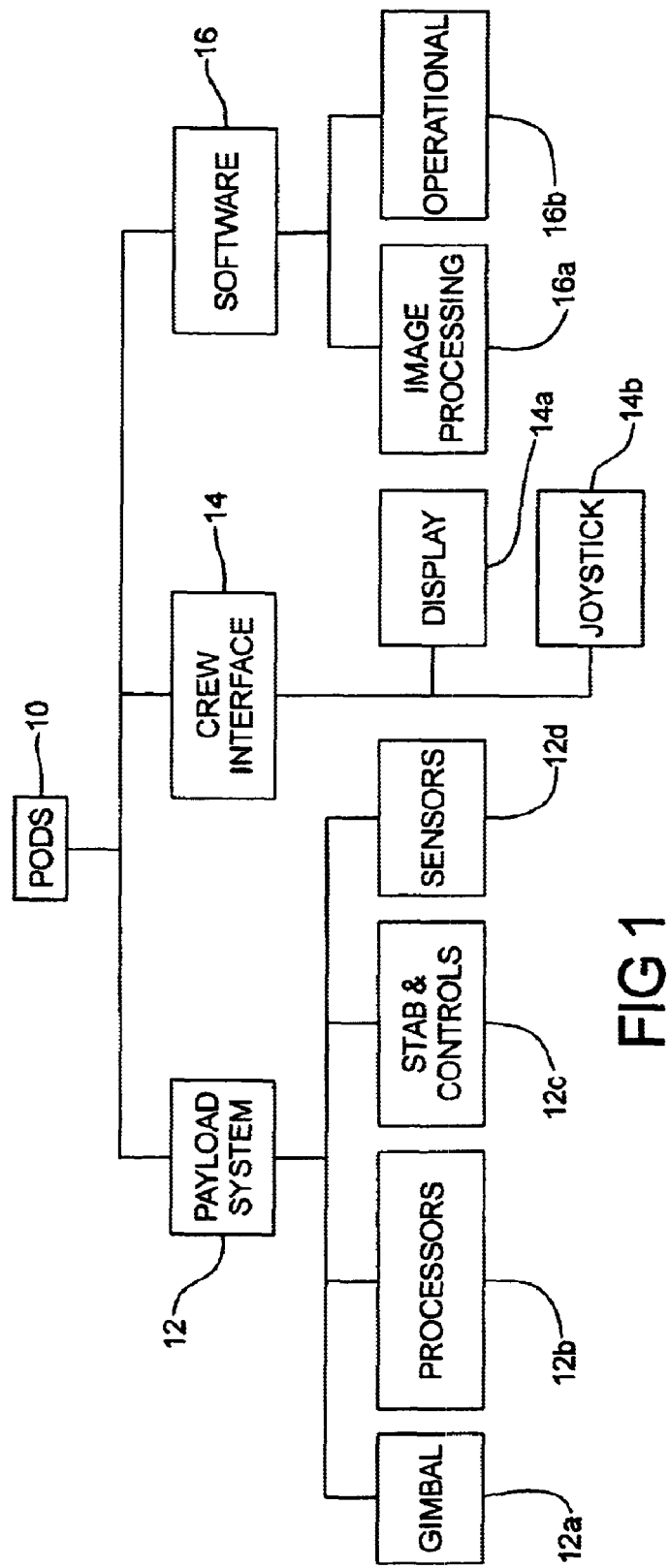
FIG. 1 is a block diagram of the passive obstacle detection system ("PODS") architecture according to the present invention.

Referring to FIG. 1, the preferred embodiment of the passive obstacle detection system of the present invention is illustrated and generally indicated by reference numeral 10. The passive obstacle detection system 10 of the present invention is hereinafter referred to as "PODS." As shown, PODS 10 comprises a payload system 12, a crew interface 14, and software 16. The payload system 12 generally includes hardware components that are installed onto the aircraft for image acquisition related to obstacles, and the software 16 generally processes the images acquired by payload system 12. The output of software 16 is transmitted to the crew interface 14, where obstacles to be avoided, i.e. power lines, are displayed for the flight crew so that evasive maneuvers can be performed.

Although the present invention is directed to an obstacle detection system for an aircraft, the invention may also be applicable to other forms of transit such as spacecraft, ships, trains, buses, and others, and further to a person in transit. Accordingly, the reference to aircraft throughout the description of the invention herein should not be construed as limiting the applicability of the invention to only aircraft.

More specifically, the payload system 12 is an infrared (IR) imaging system that comprises a gimbal 12a mounted to the aircraft, which houses the IR sensors 12d used to detect obstacles using IR imaging. The processors 12b perform calculations and data storage tasks according to algorithms of software 16 and/or programs embedded within the hardware of processors 12b. The stabilization and controls component 12c coordinates the controls of gimbal 12a with the controls of the aircraft such that the spatial positioning and image acquisition of gimbal 12a and sensors 12d are coordinated with maneuvers of the aircraft. Generally, the stabilization and controls component 12c aligns the line of sight of the sensors 12d with the aircraft velocity vector. Further, the sensors 12d are preferably infrared and are mounted inside gimbal 12a to detect obstacles in the infrared band.

The crew interface 14 generally comprises a display 14a and a joystick 14b. The display 14a provides images of the lines processed by software 16 for viewing by the flight crew. Accordingly, the flight crew can visualize the obstacle, i.e. power line, and make adjustments to the flight path in order to avoid a possible collision. The joystick 14b is used by the flight crew to manually control the gimbal 12a, and accordingly, the line of sight of the IR sensors 12d when detection of images that are not along the aircraft velocity vector is required.

The present invention further employs software algorithms for image processing within software 16. Generally, software 16 comprises image processing algorithms 16a and operational algorithms 16b, the latter of which generally integrate the image processing algorithms 16a with the other components of PODS 10. The specific image processing algorithms 16a are described in greater detail below after the following discussion related to a typical detection and avoidance sequence.

Figure 2:
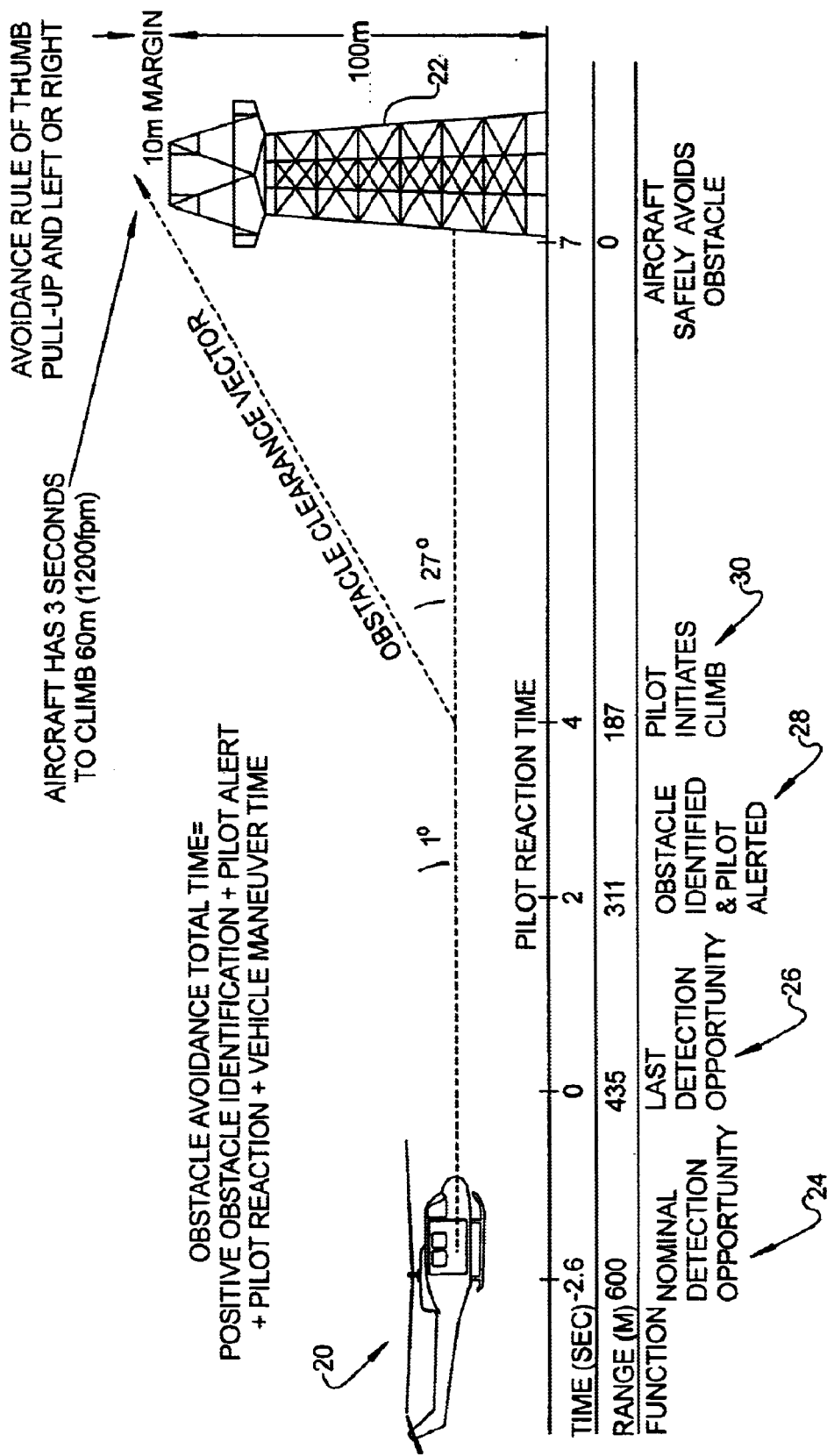
FIG. 2 is a diagram illustrating an example detection and avoidance sequence according to the present invention.

Referring to FIG. 2, an example detection and avoidance sequence of the present invention is illustrated with a helicopter 20 approaching an obstacle 22. It shall be noted that the specific values for time, range, angles, and others are only exemplary of one application to a specific helicopter flight envelope. Accordingly, the specific values will be different based on the aircraft, the flight envelope, and the geometry of the obstacle. With the specific example according to FIG. 2, the total time for obstacle avoidance is a sum of the times required for image acquisition and processing by PODS 10, pilot reaction time, and aircraft maneuver time.

As shown, there exists a nominal detection time 24, wherein PODS 10 is acquiring and processing obstacle images. Next, a last detection opportunity time 26 exists, which is the latest possible time in which PODS 10 can acquire obstacle image data and still identify the obstacle to alert the pilot with sufficient time for the pilot to react. After the last detection opportunity time 26, PODS 10 processes the obstacle image data and subsequently presents resultant images to the flight crew at the obstacle identified and pilot alerted time 28. With a total of two seconds of pilot reaction time in the given example, a pilot initiates climb time 30 is established, which is the latest time at which the pilot can initiate an avoidance maneuver. For the particular aircraft, flight envelope, and obstacle geometry shown, the aircraft has a total of three seconds to climb to a safe altitude to avoid a collision with obstacle 22. It shall be appreciated that the total obstacle avoidance time will be dependent upon the performance characteristics of the particular aircraft, its flight envelope, and the geometry of the obstacle.

Figure 3:
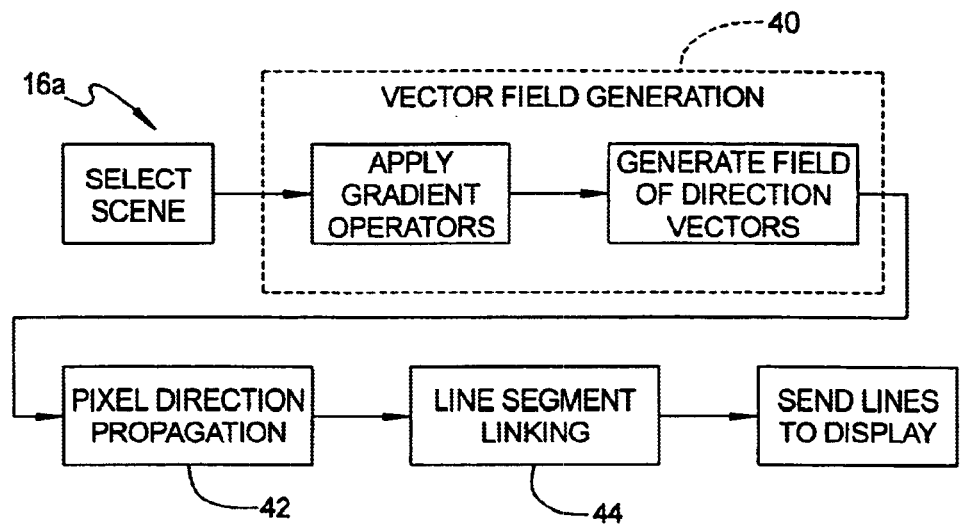
FIG. 3 is a flow diagram of the software algorithms according to the present invention.

Referring now to FIG. 3, a flow diagram is illustrated for the image processing algorithms 16a of the present invention. The image processing algorithms 16a comprise three primary software functions, namely, vector field generation 40, pixel direction propagation 42, and line segment linking 44. As shown, the input to image processing algorithms 16a is a scene or image that has been captured by PODS 10. The image is then processed, as described in greater detail below, and the output is sent to the display of the flight crew in the form of lines on a video display. Accordingly, the flight crew can visualize the lines on the display and perform evasive maneuvers as necessary. The software algorithms 16a of the present invention are further adaptable to parallel processing, which supports the real-time image processing of the present invention.

It shall be further noted that the lines to be detected according to the present invention are of a sub-pixel resolution. So that the system is of a small size and low cost, the aperture of the lens on the gimbal is accordingly limited, which results in a power line consuming only a portion of a pixel. In one preferred embodiment of the present invention, the aperture is 150 mm, which results in a 150 mm focal length for some LWIR imagers. To allow the pilot sufficient time to perform an avoidance maneuver, an obstacle must be detected at a distance of approximately 600 meters for an aircraft traveling at approximately 220 knots. With a pixel pitch of approximately 40 $\mu$m, the pixel dimensions as projected into an object space are approximately 16 cm×16 cm for an obstacle at a distance of 600 meters. Accordingly, a power line or wire of 1–3 cm in diameter will be unresolved, and therefore, the power line is at a sub-pixel level.

Figure 4:
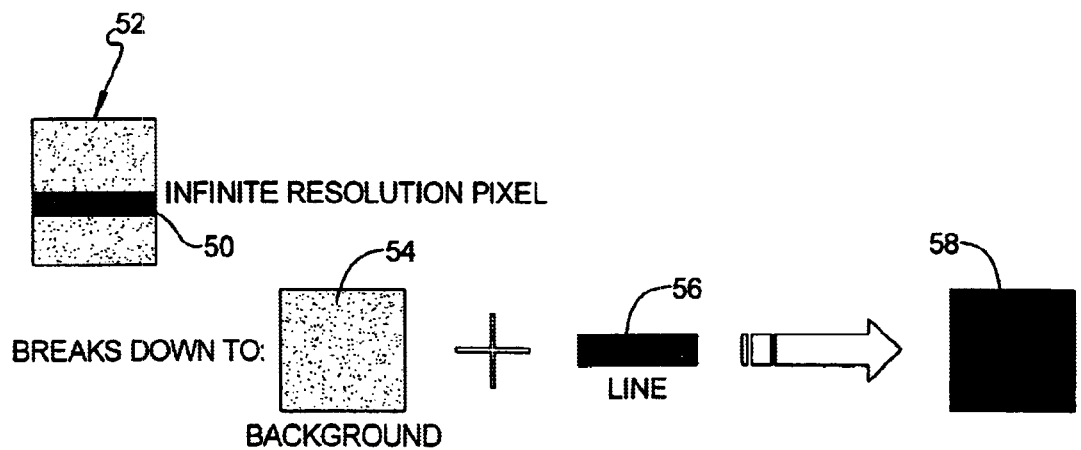
FIG. 4 is a diagram illustrating the sub-pixel resolution according to the present invention.

Referring to FIG. 4, the effect of the sub-pixel line is illustrated and generally indicated by reference numeral 50. Sub-pixel line 50 is shown within a pixel 52 such that the pixel breaks down into a background 54 plus a line 56, which results in a pixel with an intensity shift 58. With the example as set forth above, a line will consume only approximately $\frac{1}{10}$ of a pixel at a distance of approximately 600 m, resulting in an intensity shift caused by the contribution of the line 50. Although the line could be detected with systems having higher resolution, the higher resolution systems would result in such a large system that its application to an aircraft would be infeasible. For example, to resolve a line of approximately 1 cm at a distance of approximately 600 meters, a 2.4 meter (approximately 8 feet) aperture would be required, resulting in a lens of the same size in diameter. Advantageously, the software algorithms of the present invention account for the sub-pixel resolution as described in greater detail below.

Vector Field Generation

The first function of the software algorithms of the present invention involves generating a field of direction vectors for the pixels. Generally, the field comprises an x and y direction for each pixel, and further the angle of the vector. The generation of the field of direction vectors is accomplished by taking the partial derivatives of the image through convolving a directional kernel with the image. A gradient operator is calculated according to the following equation:

$$\text{Gradient Operator } \nabla f = \begin{bmatrix} \frac{\partial f}{\partial x} \\ \frac{\partial f}{\partial y} \end{bmatrix}$$

The differentiation emphasizes the high frequency components, or the pixels with a high spatial frequency, wherein:

$$\frac{\partial f}{\partial x} = f \otimes [-1\ 1]; \quad \frac{\partial f}{\partial y} = f \otimes \begin{bmatrix} -1 \\ 1 \end{bmatrix}$$

Figure 5:
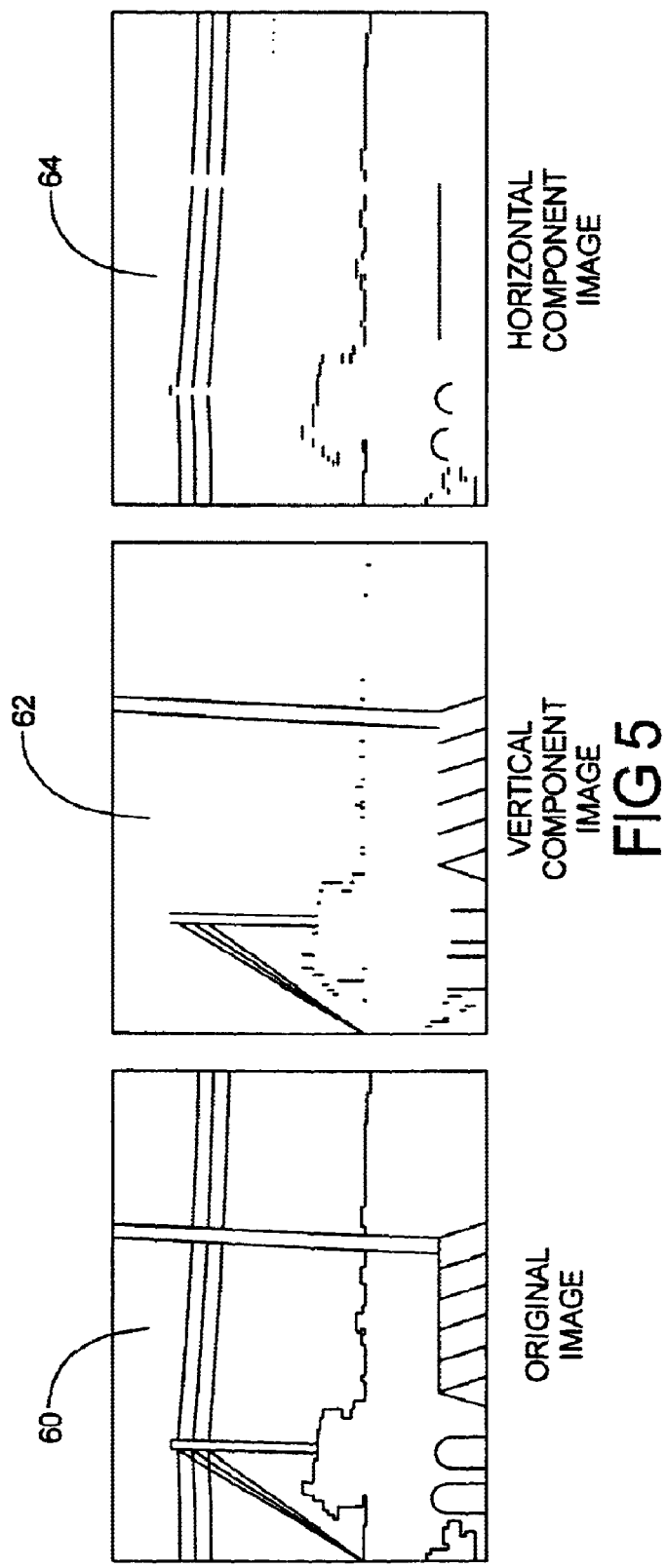
FIG. 5 is a series of images utilized and produced by the gradient operator according to the present invention.

Accordingly, FIG. 5 depicts an original image 60 prior to application of the gradient operator, along with the vertical component image 62 and the horizontal component image 64 after application of the gradient operator. As shown, a horizontal mask (kernel) emphasizes the vertical features within the original image 60 in the vertical component image 62, and a vertical mask (kernel) emphasizes the horizontal features within the original image 60 in the horizontal component image 64. The component images are then recombined to produce a magnitude image and an image of directional components as described in the following.

Figure 6:
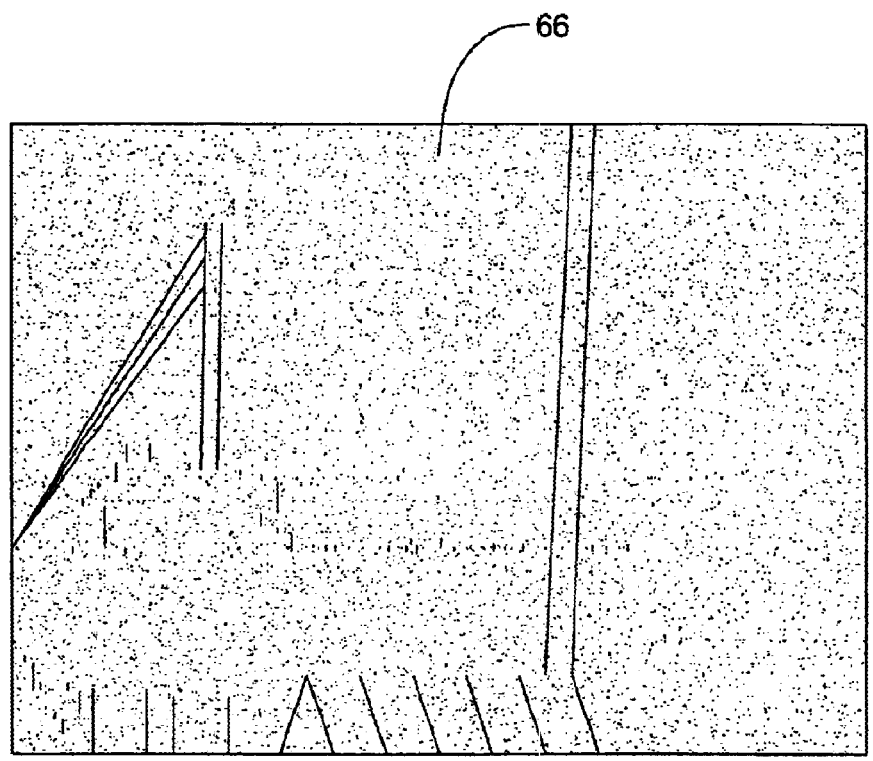
FIG. 6 is an image illustrating the recombination of gradient components in obtaining the gradient magnitude image according to the present invention.

Referring to FIG. 6, the resultant magnitude image from the vertical component image 62 and the horizontal component image 64 is illustrated and generally indicated by reference numeral 66. The equation to obtain the magnitude image, or the 2-norm, is:

$$\|\nabla f\| = \left( \left(\frac{\partial f}{\partial x}\right)^2 + \left(\frac{\partial f}{\partial y}\right)^2 \right)^{1/2}$$

Figure 7:
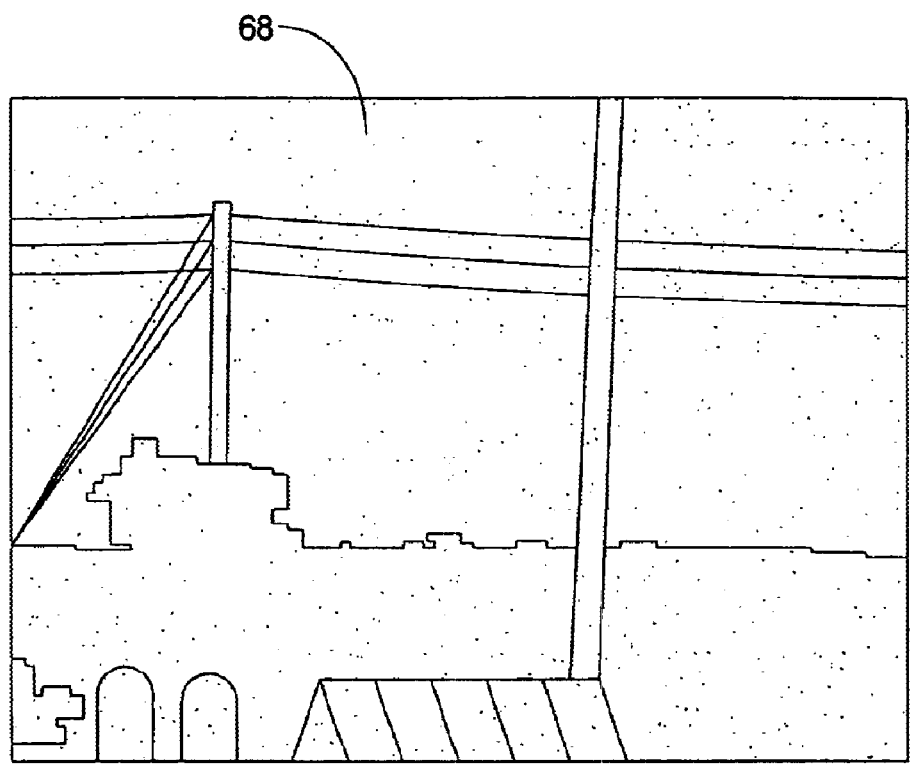
FIG. 7 is an image illustrating the recombination of gradient components in obtaining the field of direction vectors according to the present invention.

Referring to FIG. 7, the resultant directional component image is illustrated and generally indicated by reference numeral 68. The equation to obtain the directional component image is:

$$\phi(i, j) = \tan^{-1} \left( \frac{\frac{\partial f}{\partial y}}{\frac{\partial f}{\partial x}} \right)$$

Moreover, the directional component image 68 is a pseudo color image, wherein color is indicative of direction. For example, up $(-\pi)$ is dark blue and down (0) is light green. The pseudo color image is used for display purposes and is not used as a part of the image processing functions as described herein.

The direction vectors from the directional component image 68 are then used as input to the second function of the software algorithms, namely, the pixel direction propagation function that employs Cellular Automata (CA) mathematical techniques.

Pixel Direction Propagation

The second function of the software algorithms according to the present invention involves the application of Cellular Automata (CA) techniques to propagate the direction of pixels along a line segment. Generally, the CA techniques model complex systems that change over time through the application of local rules, wherein the outcome of an entire system can be predicted. The mathematical system is comprised of cells, or pixels as applied to the present invention, further arranged on a grid. Each pixel has a state, and all states evolve simultaneously according to the set of local rules such that the state at a step i+1 depends on the state in step i of the cell in question and its surrounding neighbor cells.

Figure 8:
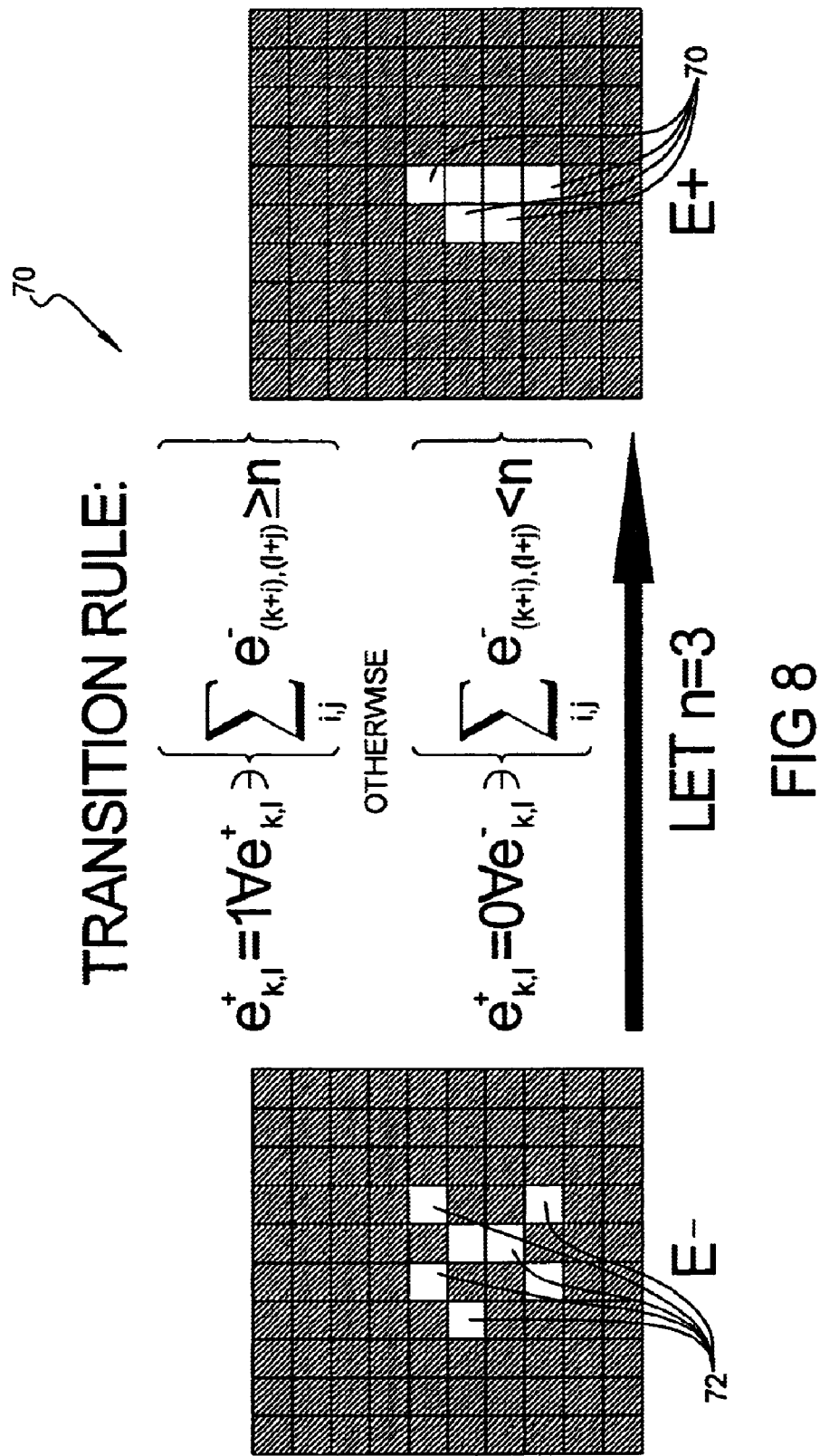
FIG. 8 is a diagram illustrating the Cellular Automata (CA) technique as applied to the "Game of Life" model according to the present invention.

Referring to FIG. 8, the CA technique of the present invention employs the "Game of Life" model that is generally illustrated and indicated by reference numeral 70. As shown, the state of a series of cells is shown at a time E− and at the next step or time E+. Also shown are the rules for propagating cells from the state E− to E+ wherein the number of neighboring cells being evaluated according to the transition rule equation shown is three. "Live" cells are white and are indicated by reference numeral 72, and all other cells are "dead" and are dark as shown.

The transition rules for the Game of Life according to FIG. 8 are:
1. A "live" cell with less than 3 living neighbors becomes "dead" from isolation;
2. A "live" cell with 3 or more living neighbors remains "live";
3. A "dead" cell with 3 or more living neighbors becomes "live."

As shown, the cells transition from "live" to "dead" and from "dead" to "alive," going from state E− to state E+, according transition rule equation as shown and illustrated.

The rules of the Game of Life are similarly applied to the direction vectors of each pixel produced by the first function of the software algorithms. Accordingly, the rules determine whether or not a pixel is to be propagated along a line based on the direction vectors of pixels. If a pixel of a certain vector direction has a neighboring pixel with approximately the same vector direction, or angle based on the x and y components, the pixel is propagated along a line. Conversely, if a pixel of a certain vector direction does not have a neighboring pixel with approximately the same vector direction, the pixel is not propagated. Depending on the application, a certain tolerance or error in the angle of the neighboring vector direction is accounted for within the CA routine.

Further, the "momentum" of the pixels are given weight in the algorithm such that if a pixel has been propagated along a line for several frames and suddenly the pixel is to be turned off, the algorithm contemplates that the discontinuity could be noise, i.e. bird sitting on wire, and continues for some distance beyond the discontinuity.

Figure 9:
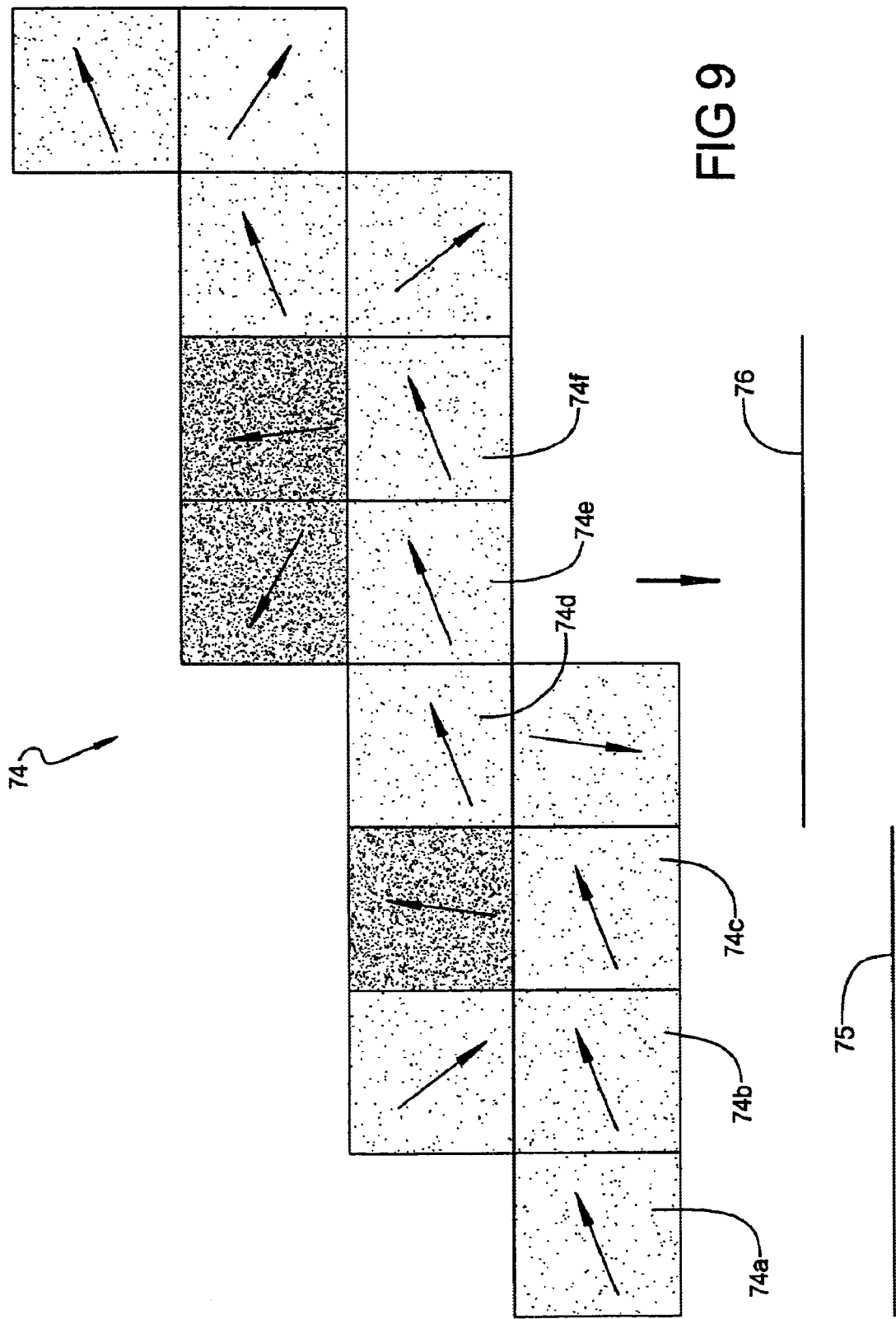
FIG. 9 is a diagram illustrating application of the Cellular Automata (CA) technique as applied to the pixel direction vectors according to the present invention.

Referring to FIG. 9, the direction vectors for the pixels are illustrated and generally indicated by reference numeral 74. A line segment propagates from one evolution to the next, growing by one pixel per evolution if a neighboring pixel has approximately the same direction vector. As shown, pixels 74a, 74b, and 74c all have the same direction vector. Accordingly, the three pixels are propagated along a line to produce line segment 75. Similarly, pixels 74d, 74e, and 74f all have the same direction vector. Again, the pixels are propagated along a line to produce line segment 76. Accordingly, the CA algorithm produces a series of line segments, 75 and 76, based on the direction vectors of individual pixels and neighboring pixels. The line segments then represent objects such as power lines within the obstacle field.

Line Segment Linking

The third function of the software algorithms according to the present invention is one that processes the line segments produced by the CA algorithm as previously set forth. The third function links the line segments when appropriate using a third order curve fitting function. If some segments can be fit to other segments using a simple curve fit, then the segments are linked. The linked line segments are then sent to the display where the flight crew can visually ascertain the obstacle and perform evasive maneuvers as required.

In another preferred form, the present invention provides passive ranging, wherein an optical flow field is produced to reduce the probability of false alarm rates. Generally, optical flow is a representation of the motion of objects projected onto the image plane of a camera. The information that can be extracted from the optical flow include, but are not limited to, recovery of observer motion, segmentation from edge-finding, determination of surface orientations, and depth-mapping. Specifically, depth-mapping can be used to determine range from the observer to objects in a scene or image.

Figure 10:
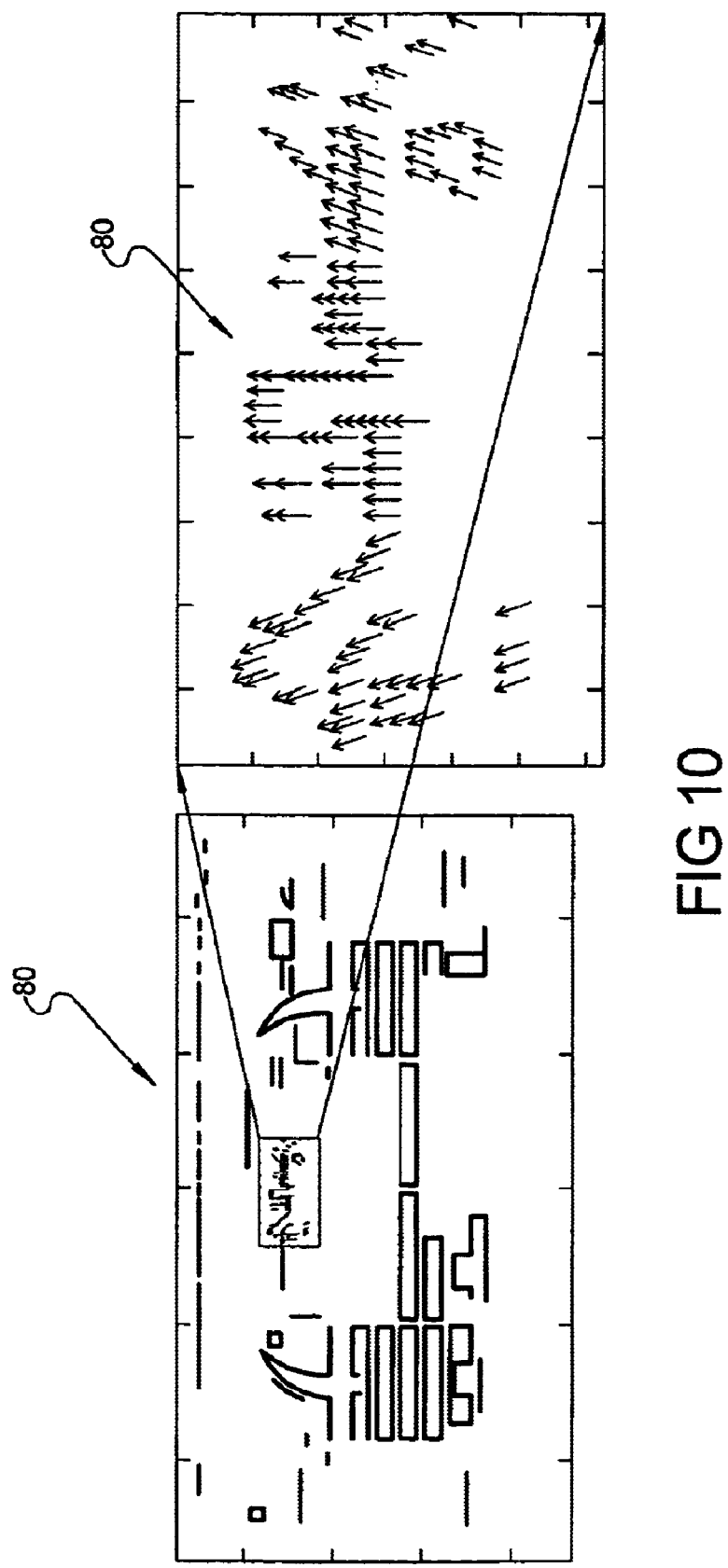
FIG. 10 is a diagram illustrating the optical flow field according the passive ranging system of the present invention.

Referring to FIG. 10, the optical flow field is illustrated and generally indicated by reference numeral 80. The optical flow field 80 is shown for two frames of images while approaching a sign. As shown, the vectors point outward, thereby indicating that the observer, i.e. aircraft, is approaching the sign. The vectors also indicate how close the obstacle is and in what direction the obstacle is approaching. Further, obstacles that are at much further distance than closer obstacles, for example a road on a mountainside at 5 miles versus a power line at 500 meters, result in a smaller spacial displacement and thus there is no effective change in the optical flow field 80. Accordingly, a road on a mountainside at a distance of 5 miles that would normally trigger an alarm is effectively filtered out with the optical flow field according to the present invention.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A passive obstacle detection system for a mobile platform, comprising:

an infrared imaging system that acquires images;

a software system that processes images acquired by the infrared imaging system; and a crew interface that displays the images processed by the software system, the crew interface responsive to the infrared imaging system to enable a user to control the acquisition of images to acquire images on a direct flight path of a mobile platform and to acquire images outside the direct flight path of the mobile platform, wherein the software system further comprises cellular automata routines that propagate pixels along a line according to a set of local rules, thereby producing line segments that are linked and presented on the crew interface as obstacles.

2. The passive obstacle detection system of claim 1, wherein the software system further comprises a function to generate a field of direction vectors.

3. The passive obstacle detection system of claim 2, wherein the function to generate a field of direction vectors further comprises partial directional derivatives of pixels within the images.

4. The passive obstacle detection system of claim 2, wherein the function to generate a field of direction vectors further comprises a vertical mask and a horizontal mask to form a magnitude image.

5. The passive obstacle detection system of claim 2, wherein the function to generate a field of direction vectors further comprises pseudo colors that are indicative of direction.

6. The passive obstacle detection system of claim 1, wherein the cellular automata routines further comprise a model which determines whether to propagate a pixel based on a set of rules.

7. The passive obstacle detection system of claim 1, wherein the line segments are of a sub-pixel resolution.

8. A passive obstacle detection system for a mobile platform, comprising:

an infrared imaging system that acquires images in a direct path of a mobile platform and outside the direct path of the mobile platform based upon an input from an operator; and a software system that processes images acquired by the infrared imaging system;

wherein the software system further comprises cellular automata routines that propagate pixels along a line according to a set of local rules, thereby producing line segments that are linked and determined to be obstacles.

9. The passive obstacle detection system of claim 8, wherein the software system further comprises a function to generate a field of direction vectors.

10. The passive obstacle detection system of claim 9, wherein the function to generate a field of direction vectors further comprises partial directional derivatives of pixels within the images.

11. The passive obstacle detection system of claim 9, wherein the function to generate a field of direction vectors further comprises a vertical mask and a horizontal mask to form a magnitude image.

12. The passive obstacle detection system of claim 9, wherein the function to generate a field of direction vectors further comprises pseudo colors that are indicative of direction.

13. The passive obstacle detection system of claim 8, wherein the cellular automata routines further comprise a model which determines whether to propagate pixels based on a set of rules.

14. The passive obstacle detection system of claim 8, wherein the line segments are of a sub-pixel resolution.

15. A passive obstacle detection system for a mobile platform, comprising:

a control device manually operable by a user;

an infrared imaging system able to be aimed in response to user movement of the control device, that acquires images based on the input from the control device; and a software system that processes images acquired by the infrared imaging system;

wherein the software system further comprises cellular automata routines that propagate pixels along a line according to a set of local rules, thereby producing line segments that are linked and determined to be obstacles such that travel of the mobile platform is automatically adjusted according to the obstacles to avoid contact with the obstacles.

16. A method for detection of obstacles, the method comprising the steps of:

(a) acquiring an image based on a positioning input from a control device manually operated by an operator;

(b) generating a field of direction vectors for pixels acquired by an imaging system;

(c) propagating the pixels along a line using cellular automata techniques to produce line segments;

(d) linking the line segments; and (e) presenting the linked line segments as obstacles.

17. The method of claim 16 wherein the step of generating a field of direction vectors further comprises determining partial directional derivatives of pixels within the images.

18. The method of claim 16, wherein the step of generating a field of direction vectors further comprises generating a vertical mask and a horizontal mask to form a magnitude image.

19. The method of claim 16 wherein the step of generating a field of direction vectors further comprises generating pseudo colors that are indicative of direction.

20. The method of claim 16, wherein the cellular automata techniques further comprise a model which determines whether to propagate the pixels based on a set of rules.

* * * * *